Oct. 28, 1924.                                        1,513,698
I. H. DOW
POTATO DIGGER ATTACHMENT
Filed March 31, 1921
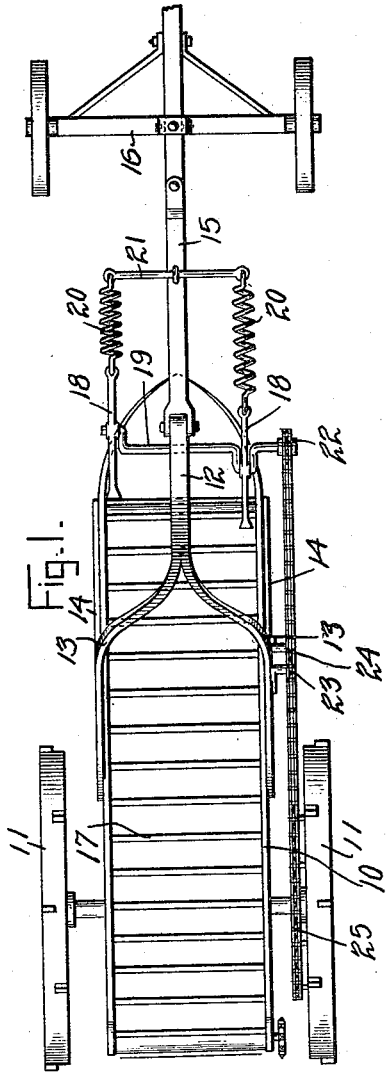
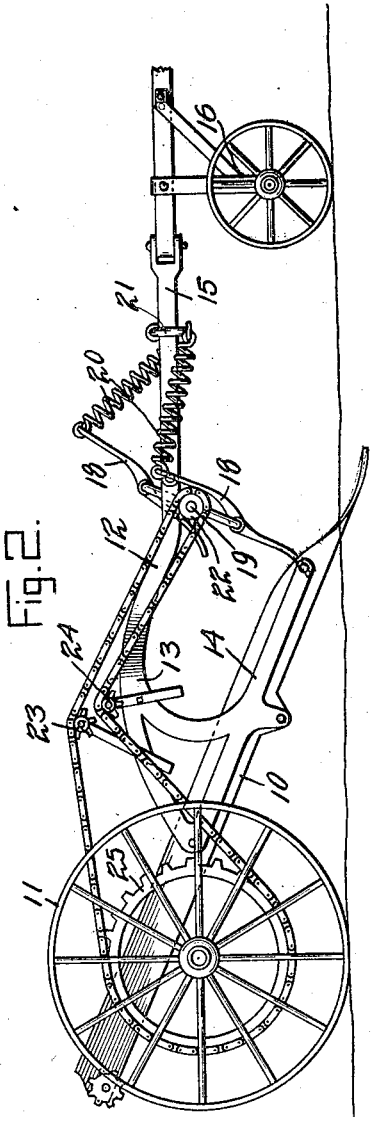
Inventor
Issachar H. Dow
By  [signature]
Attorney Patented Oct. 28, 1924.

1,513,698

UNITED STATES PATENT OFFICE.

ISSACHAR HAMMOND DOW, OF EASTON, MAINE.

POTATO-DIGGER ATTACHMENT.

Application filed March 31, 1921. Serial No. 457,417.

*To all whom it may concern:*

Be it known that I, ISSACHAR H. Dow, a citizen of the United States, residing at Easton, in the county of Aroostook and State of Maine, have invented certain new and useful Improvements in Potato-Digger Attachments, of which the following is a specification.

My said invention relates to a potato digger and it is an object thereof to provide an attachment designed to prevent vines and weeds from catching on the machine which gives rise to clogging and retardation of the operation of the machine particularly when the ground is sticky.

Another object is to prevent loss and destruction of potatoes in the operation of digging.

Referring to the accompanying drawings which are made a part hereof and on which similar reference characters indicate similar parts.

Figure 1 shows a plan of my device, and Figure 2 an elevation thereof.

In the drawings reference character 10 indicates a digging device of conventional type mounted on wheels 11 in the ordinary manner. A central beam 12 has at its rear two forks 13 which are fastened to opposite sides of the digger and which preferably have forward projections 14 extending along the sides of the digger 10 to provide a secure connection between the beam and the digger. A link 15 is attached to the front end of beam 12 and a truck 16 of conventional type is attached to the link 15, the truck being propelled by horses or by power in conventional manner. Extending over the main portion of the digger and down to its blade is a conveyor or picker 17 of ordinary type. My improvement is intended to prevent vines and weeds from catching on the forward parts of the machine or on the parts adjacent the picker and consists mainly in the provision of kickers 18. These kickers are mounted on a crank-shaft 19 near the front of the beam 12 and have attached to their upper ends springs 20 which are connected to a transversely extending rod 21. Preferably this rod is bent down at the sides of the link 15 as shown in Figure 2, the springs being attached to the extreme ends in alignment with the kickers 18. At one end of the crank-shaft is a sprocket wheel 22 and a sprocket chain passes over this sprocket, rearward over idler sprockets 23, 24 and then over a driving sprocket 25 fixed to one of the supporting wheels 11.

In the operation of the machine the kickers are driven from the sprocket wheel 25 in an obvious manner. As the crank-shaft revolves the kickers are alternately moved up and down and their broad flat lower extremities move adjacent the upper face of the digger blade in such a manner as to engage any large and bushy vines, weeds or the like. As the kickers move toward the rear of the machine they drive such vegetation backward and tend to prevent it from hanging over the edge of the lower portion of the digger. Without such an attachment the spreading vines and weeds hanging over the side of the digger act to retard the progress of portions of the hill of potatoes and cause it to crumble or break before it reaches the elevator, causing the potatoes in the hill to become scattered, whereupon they roll off the side of the machine and are cut or bruised or lost in the débris. With the attachment the hill remains intact until it reaches the conveyor and the vegetation is carried up at the sides of the conveyor and normally a little higher than the hill of potatoes, thus keeping the hill in proper position. Even if the hill be now broken the potatoes will retain approximately their proper position near the midline of the machine. Another detrimental feature in ordinary machines is that the vines and weeds clog the machine so badly that extra men are necessary for clearing away the vegetation and even then it is necessary to stop the machine to clear it. With my device the kickers prevent such clogging by carrying the vegetation into the field of operation of the conveyor. My device enables the farmer to dig potatoes as well going up or down hill as on a level without extra help to keep the machine clear and this is done by preventing crumpling of the potato hills on the blade of the digger before they reach the conveyor. The springs 20 cause the kickers to have a yielding action thereby preventing breaking of the parts. If a rock or other heavy obstruction be carried up by the picker, the kicker can swing so as to pass over it and excessively tangled vegetation will also cause a similar action instead of breaking the kicker. The blades of the kicker may, if desired, be sharpened so that they can cut vegetation hanging over the edges of the digger blade, but this is not ordinarily considered necessary.

This application is generally similar to my abandoned application No. 161,239, filed April 11, 1917.

Having thus fully described my said invention, what I claim as new and desire to secure by Letters Patent, is:

1. In a potato harvester, an elongated digger element, supporting wheels adjacent the rear end thereof, a blade at the front end, a tongue attached to the sides of the digger and extending over the blade, a crankshaft on the tongue, pivoted kickers on the crankshaft, a truck in advance of the digger, a link connecting the truck to the tongue, a transverse bar on the link, and springs attached to the bar and to the upper end of each kicker, substantially as set forth.

2. In a potato harvester, a digger element, a forwardly inclined conveyor element, a tongue attached to the conveyor and extending forwardly therefrom, a crankshaft carried by the tongue, kickers mounted on the crankshaft, means pivotally connected to the tongue for towing the digger element, and springs having their ends attached to the kickers and said towing means, substantially as set forth.

In witness whereof, I have hereunto set my hand and seal at Easton, Maine, this 22nd day of March, A. D. nineteen hundred and twenty-one.

ISSACHAR HAMMOND DOW. [L. S.]

Witnesses:
CARL A. WEICK,
MARJORIE H. WILDER.